(No Model.)
H. W. FOLSOM.
FRUIT PICKER.
No. 308,148. Patented Nov. 18, 1884.
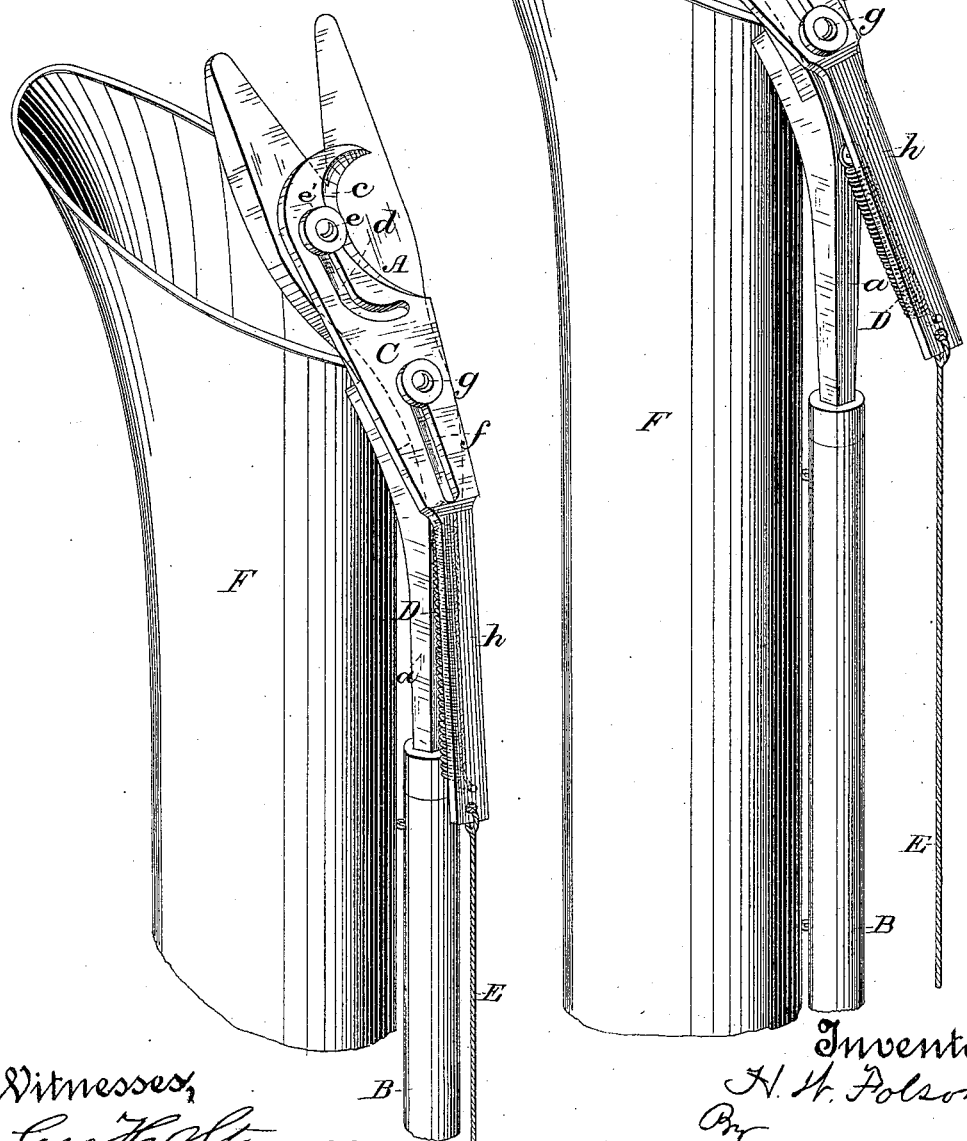
Witnesses,
Geo. H. Strong
J. H. Towne
Inventor,
H. W. Folsom
By Dewey & Co.
Attorneys
N. PETERS, Photo-Lithographer, Washington, D. C.

UNITED STATES PATENT OFFICE.

HENRY W. FOLSOM, OF SAN FRANCISCO, CALIFORNIA.

FRUIT-PICKER.

SPECIFICATION forming part of Letters Patent No. 308,148, dated November 18, 1884.

Application filed January 21, 1884. (No model.)

*To all whom it may concern:*

Be it known that I, HENRY W. FOLSOM, of the city and county of San Francisco, and State of California, have invented an Improvement in Fruit-Pickers; and I hereby declare the following to be a full, clear, and exact description thereof.

My invention relates to a new and useful fruit-picker of that class in which a knife or blade cuts shearwise across a V-shaped guide; and it consists in a novel arrangement of knife and guide, whereby the stems of the fruit are easily reached without interference, and in a peculiar connection between the said knife and guide, whereby an effective cut is made, which combines both a shear-like action and a draw cut, as I shall hereinafter fully explain, reference being made to the accompanying drawings, in which—

Figure 1 is a perspective view of my fruit-picker, showing the knife C at rest. Fig. 2 is a view showing knife C in a position after a cut has been made.

The fruit-pickers of this class have their guide by which they find the stems of the fruit bent at so great an angle with the handle by which it is held that it is difficult to operate it from a convenient position; and, further, the parts are so constructed that, generally, the lever of the knife projects so far from the guide as to be in the way and render it inconvenient to find the stems. This is a disadvantage in all kinds of work of this nature; but is more conspicuous when used for picking oranges or other fruit which grow in clusters.

The object of my invention is to provide a fruit-picker the parts of which shall not be in the way of the perfect operation of the device, and which in its operation shall make a clean and sure cut.

A is the guide, the upper end of which is V-shaped, and is bent at a very small angle, as shown, from its shank *a*, to which the handle or pole B is attached.

C is the knife or blade on the face of the guide A. This knife has its upper end formed into a hook-shaped cutting-edge, *c*, adapted to move across and down the V-shaped opening of the guide. Its movement is accomplished by reason of its connection as follows: In its body near its upper end is made a curved slot, *d*, through which a pin or screw, *e*, passes loosely and is secured to the guide. A washer, *e'*, is preferably placed on the screw to hold it. Below the slot *d* is another slot, *f*, made straight, and a pin or screw, *g*, passes loosely through it into the body of the guide. The shank *h* of the knife is bent at a slight angle, leaving a space between itself and the shank of the guide, in which is a spiral spring, D, connecting the lower end of shank *h* with the upper end of shank *a*, and exerting its influence to hold the knife up to its limit, as shown in Fig. 1, where the guide pins or screws are at the lower ends of their respective slots. It will be seen from Fig. 1 that even when at rest the ends of the knife C project over the sides of the guide so very little as not to be in the way, and when, as shown in Fig. 2, the cut is made and the knife drawn down it does not project beyond the guide at all, but lies upon its face parallel with it.

E is the cord secured to the lower end of shank *h* of the knife and passing down in guides on the pole to convenient reach.

F is the conveyer, the expanded mouth of which is secured to the inner side of the guide in position to receive, in usual manner, the fruit when picked. By pulling down on the cord the body of the knife travels down on screw *g* and turns on it at the same time. Its upper portion travels at an incline downward on the screw *e* to the curve of its slot *d*, when the whole knife travels down on both. The effect of this movement is to first throw the cutting-edge in a downward curve across the V-shaped guide, thus completely inclosing the stem or stems which the guide had previously embraced, and then to draw it almost directly down upon the stems to sever them. I have found this movement to be very effective, and much superior to that which would be the result of a stationary pivot.

On account of the small inclination of the body or top of the guide, I am enabled to readily get at the stems by a more direct thrust than if it were at a greater angle, and by reason of the shape and connection of the knife and guide they do not project to one side to any extent, either at rest or in operation, so that there is no interference whatever.

The simplicity of the device and its lightness and cheapness are features showing its advantages and general utility.

Having thus described my invention, what I claim as new, and desire to secure by Letters Patent, is—

1. In a fruit-picker, the guide A, having a V-shaped top bent out of line with its shank $a$, as shown, in combination with the knife C, having a bent shank, $h$, a hook-shaped cutting-edge, $c$, curved slot $d$ and straight slot $f$, through which pins or screws $e$ $g$ loosely pass into the guide, whereby the knife is pivoted thereto, the cord E for pulling the knife down, and the spring D between the shanks of the knife and guide and secured to them, for returning the knife, substantially as herein described.

2. A fruit-picker consisting of the handle or pole B, the guide A, having shank $a$ secured to the pole, and a V-shaped top bent forward at a small angle, the conveyer F, secured to the guide, the slotted draw-knife C, pivoted to the face of the guide, as described, and the cord E, and spring D, all arranged and combined substantially as herein described.

3. In a fruit-picker, the V-shaped guide A, in combination with the knife C, having a hooked cutting-edge, $c$, the curved slot $d$, and a straight slot, $f$, both in the body of the knife, and suitable guide pins or studs in the guide fitting through the slots in the knife, whereby the knife is guided and directed in its movements on the guide, substantially as herein described.

In witness whereof I have hereunto set my hand.

H. W. FOLSOM.

Witnesses:
C. D. COLE,
J. H. BLOOD.